Nov. 19, 1968  H. BARRAS  3,411,225
AUTOMATICALLY REGULATABLE DRAIN CLEANER
Filed April 20, 1966  3 Sheets-Sheet 3

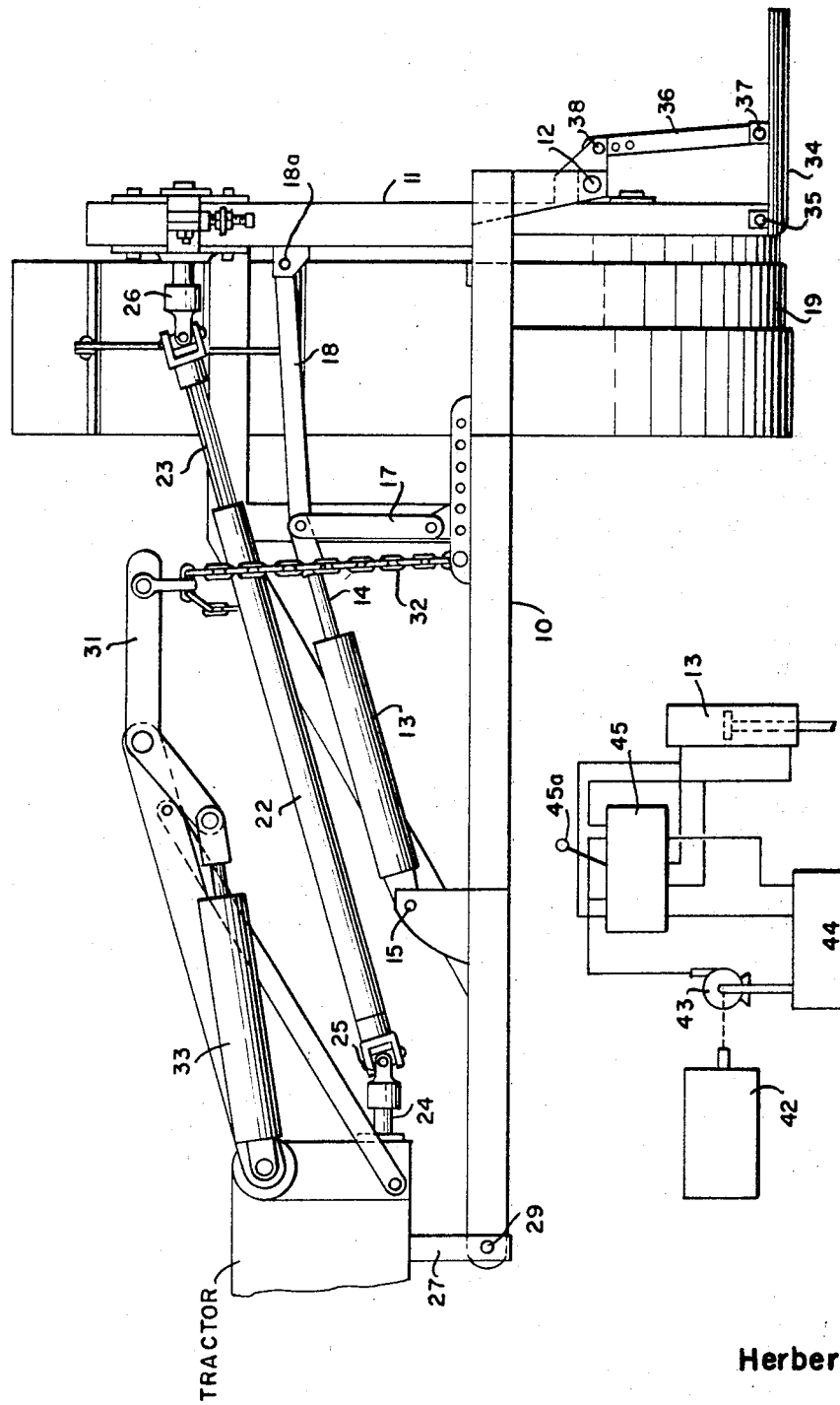

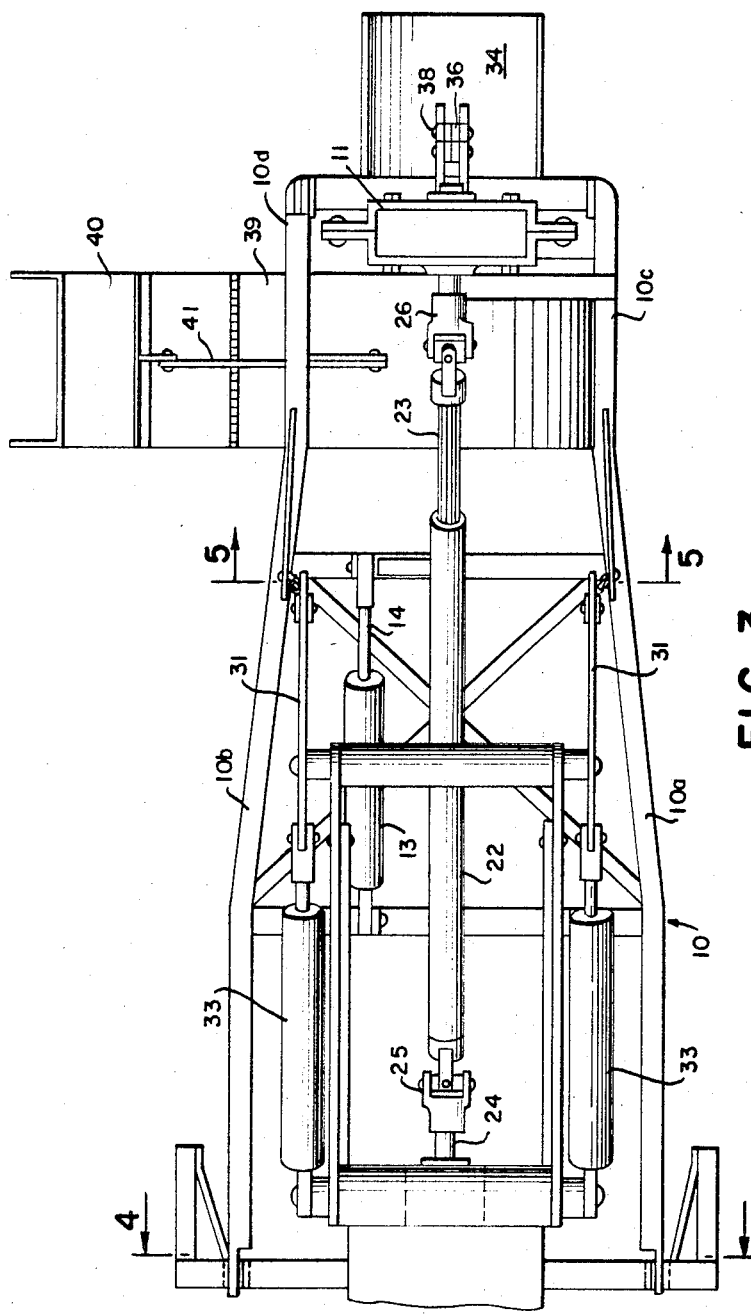
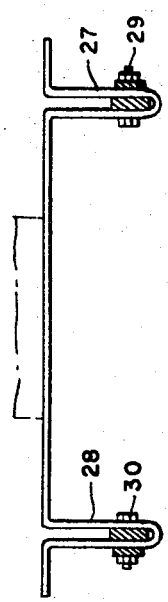

INVENTOR
Herbert Barras

BY Wilkinson, Mawhinney & Theibautt
ATTORNEYS 3,411,225
AUTOMATICALLY REGULATABLE
DRAIN CLEANER
Herbert Barras, P.O. Box 327,
Baldwin, La. 70518
Filed Apr. 20, 1966, Ser. No. 543,976
1 Claim. (Cl. 37—93)

ABSTRACT OF THE DISCLOSURE

The present invention is directed to an automatically regulatable drain cleaner for use with a tractor having an engine driven hydraulic pump and power take-off. The structure consists essentially of a main frame pivotally connected to the tractor and a secondary frame pivotally connected to the main frame at the rear thereof. A rotary earth engaging cutter and earth distributor are carried by the secondary frame and in particular a means is provided for varying the pitch angle of attack of the rotary earth cutter during rotation thereof by way of hydraulically varying the angle between the pivoted secondary frame and the main frame in accordance with operational variable conditions at the discretion of the tractor operator. This is accomplished by providing a hydraulic control valve accessible to the tractor operator for varying the pitch angle of attack of the earth cutter.

---

An object of the present invention is to provide an attachment which may be readily coupled to a sugar cane or the like tractor, which tractor has a hydraulic system driven by a hydraulic pump connected to the engine and a power take-off. The apparatus of the present invention comprises a main frame attachable to the tractor and a secondary frame pivoted at the rear of the main frame which carries the earth cutting members, the angle of attack of which it is desired to vary during certain conditions of earth working.

Another object of the present invention is the provision of a hydraulic control system having a control valve accessible to the tractor operator, which control valve is in fluid circuit with a hydraulic cylinder and ram for controlling the angle of tilt of the secondary frame relative to the main frame.

A further object of the present invention is the provision of a secondary frame which houses the chain drive for the cutter carried by the secondary frame.

A still further object of the present invention is the provision of regulating means in the form of a hydraulic cylinder and ram adapted to be placed in fluid circuit with the tractor hydraulic system, one end of which is connected to the main frame and the ram of which is connected to tilt the secondary frame.

The rotary cutter carried by the secondary frame is provided with means for coupling the driving connection of the rotary cutter to the power take-off of the tractor.

With the foregoing and other objects in view, the invention will be more fully described hereinafter, and will be more particularly pointed out in the claim appended hereto.

In the drawings, wherein like symbols refer to like or corresponding parts throughout the several views:

FIGURE 1 is a side elevational view of the device constructed in accordance with the present invention.

FIGURE 2 is a hydraulic schematic showing the fluid circuitry for controlling the tilt mechanism of the present invention.

FIGURE 3 is a top plan view of the apparatus of FIGURE 1.

FIGURE 4 is a section taken on the line 4—4 in

FIGURE 3, showing the tractor stirrups to which the apparatus of the present invention is adapted to be connected.

Figure 5:
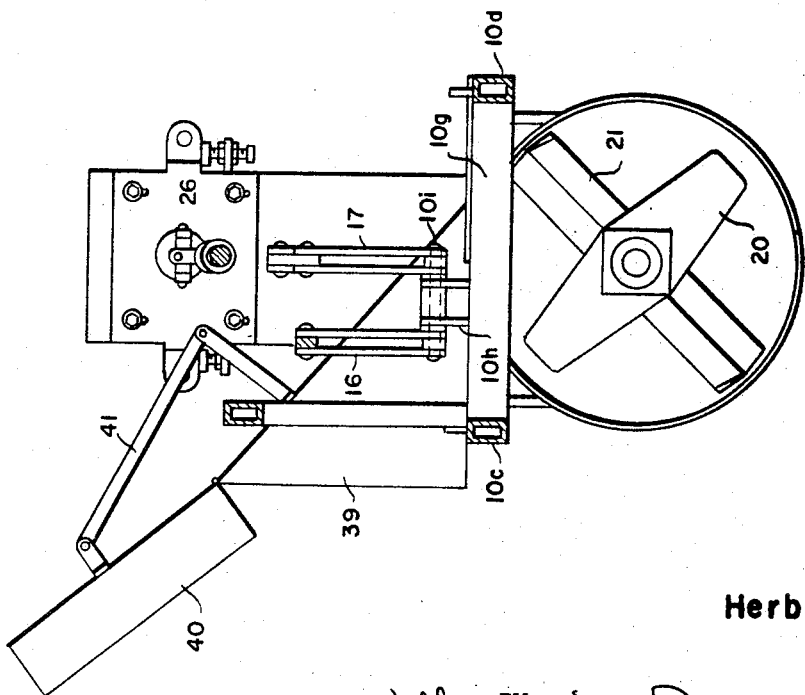

FIGURE 5 is a vertical section taken on the line 5—5 in FIGURE 3.

Figure 6:
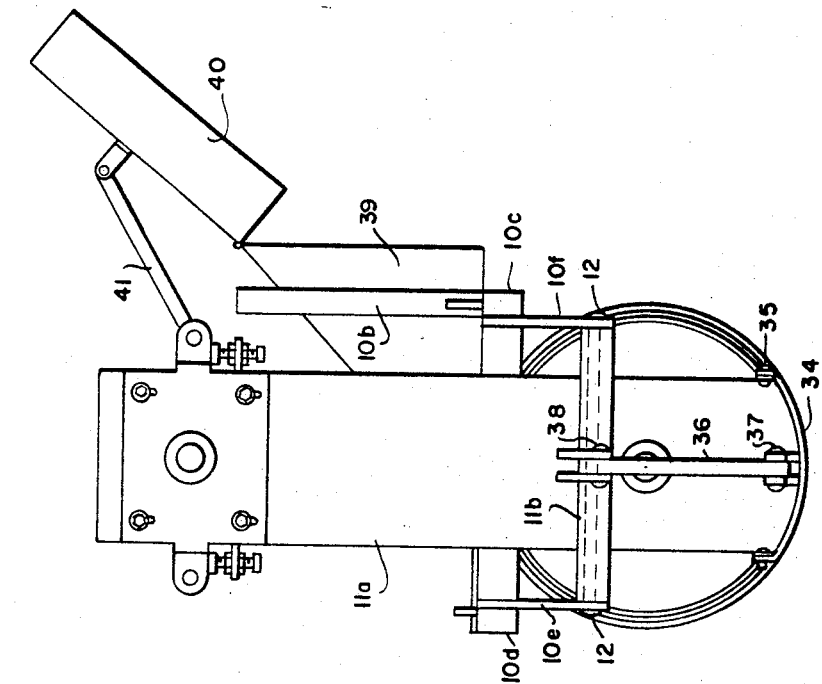

FIGURE 6 is a rear elevational view of the apparatus of the present invention.

Referring for the moment to FIGURES 1 through 3 inclusive, 10 designates generally a main frame having a secondary frame 11 pivoted at its rear portion at 12. A hydraulic cylinder 13 having a ram 14 is connected to the main frame at 15 and through a linkage 16, 17 and 18 to the secondary frame 11 to regulate the tilt angle thereof about the pivot 12. The secondary frame carries at its bottom a rotary cutter 19 having primary earth-engaging blades 20 and earth scattering blades 21 of the type shown and described in my Patent No. 3,132,430.

The rotary cutter receives its power from an axially slidable splined shaft connection 22 and 23 which is adapted to be connected to the power take-off 24 of the tractor and to communicate its motion through universal joints 25, 26.

The main frame 10 is adapted to be coupled to a tractor which has stirrups 27, 28 by pivots 29 and 30. The usual implement elevating arm 31 is connected to the main frame 10 by a chain 32 to raise and lower the main frame under the control of a hydraulic cylinder 33 for raising the main frame and cutting implements during transport of the tractor to and from the work site.

Referring now to FIGURE 3, the main frame 10 has longitudinal runners $10^a$ and $10^b$ which converge rearwardly at $10^c$ and $10^d$ and which have rear extensions $10^e$ and $10^f$ through which the pivots 12 of the secondary frame are passed.

A crossmember $10^g$ provides a support base for lugs $10^h$ to which links 16 and 17 are pivoted at $10^i$, as best seen in FIGURE 5.

The secondary frame 11 consists principally of a chain box housing $11^a$ having lugs $11^b$ at the rear thereof through which the pivot 12, between the main frame and secondary frame, passes. At the rear bottom portion of the secondary frame is secured a skid plate 34 which is pivoted at one end to the secondary frame 11 at 35 and which has a setting link 36, one end of which is pivotally secured to the skid plate 34 at 37 and the other end of which is pivotally secured to the secondary frame at 38 for imparting a mean cutting attitude to the earth cutters 19. Carried by the main frame 10 are earth deflecting chutes 39 and 40 provided with regulating linkage 41 for controlling the scatter pattern of earth being hurled therefrom.

Referring now to FIGURE 2, the tractor engine is shown at 42 driving a hydraulic pump 43 which receives its oil from a hydraulic sump 44. A four-way hydraulic valve 45 selectively communicates hydraulic fluid under the influence of the valve-operating lever $45^a$ to the operating cylinder 13 and, dependent upon the degree of opening of the valve 45, the cylinder 13 will tilt the secondary frame 11 through the linkage of the cylinder 13, ram 14, links 16, 17 and 18; the link 18 being pivotally connected to the secondary frame 11 at $18^a$.

In operation, when it is desired to employ the apparatus of the present invention, the main frame is first coupled to the stirrups 27 and 28 of the tractor by pivoted bolts and nuts 29 and 30. The chain 32 is then connected to the main frame 10, at which point the main frame and its connected secondary frame may be raised and lowered in order to elevate the frame for transport from the storage area to the operating area.

The hydraulic cylinder 13 is then coupled in fluid circuit with valve 45 so that upon the operator cracking the valve lever 45ᵃ the secondary frame 11 may be tilted relative to the main frame 10. The power take-off 24 is then connected to the chain drive within the casement of the secondary frame 11 through the spline driving shafts 22, 23. When the operator has determined the mean angle of cut to be made by the rotary cutters 19 the position of the skid plate 34 is then determined and set by passing the pivot 38 through the desired opening in the link 36.

When it is desired to increase the angle of cut, the tractor operator controlling the valve lever 45ᵃ will either increase or decrease hydraulic pressure to the cylinder 13 which, through the above-recited linkage, will cause the secondary frame carrying the cutters 19 to tilt relative thereto to give the desired angle of cut.

Although I have disclosed herein the best form of the invention known to me at this time, I reserve the right to all such modifications and changes as may come within the scope of the following claim.

What is claimed is:

1. An automatically regulatable drain cleaner for use with a tractor having mounting stirrups, engine-driven hydraulic pump and a power take-off comprising
    (a) a main frame adapted to be pivotally connected to the tractor stirrups for up and down movement,
    (b) a secondary frame pivotally connected to the main frame at the rear thereof for tilting said secondary frame relative thereto,
    (c) a rotary earth engaging cutter and earth distributor carried by said secondary frame,
    (d) drive means for driving said earth-engaging cutter and earth distributor adapted to be connected to the power take-off of the tractor,
    (e) a hydraulic cylinder and ram adapted to be placed in fluid circuit with the tractor hydraulic pump, one end of said cylinder being connected to said main frame and the ram being connected to tilt said secondary frame to vary the pitch angle of attack of the earth cutter during rotation thereof, and
    (f) a hydraulic control valve in fluid circuit with said cylinder and pump to control said tilt of the secondary frame.

References Cited
UNITED STATES PATENTS

| | | | |
|---|---|---|---|
| 2,974,735 | 3/1961 | Smith et al | |
| 3,101,794 | 8/1963 | Bechman | 172—698 |
| 3,132,430 | 5/1964 | Barras | 37—92 |
| 3,261,117 | 7/1966 | Shoemaker et al. | 37—92 |

ROBERT E. PULFREY, *Primary Examiner.*

CLIFFORD D. CROWDER, *Assistant Examiner.*